PRENTISS & ROBERTSON.
Apparatus for Purifying and Deoderizing Whisky.
No. 56,864.   Patented July 31, 1866.
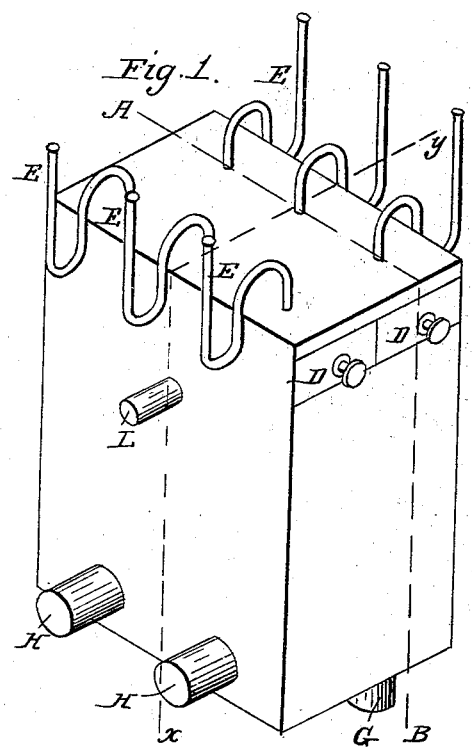
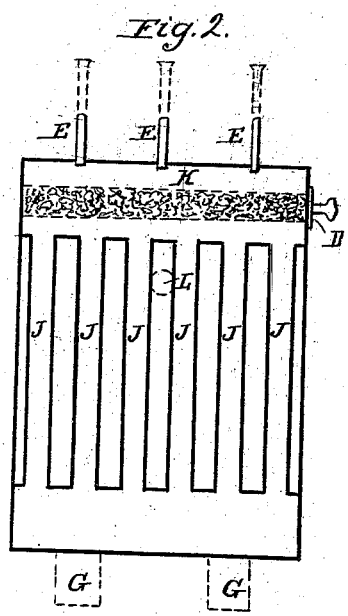
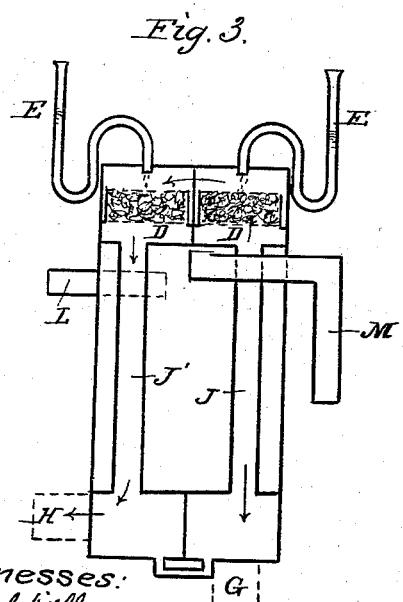
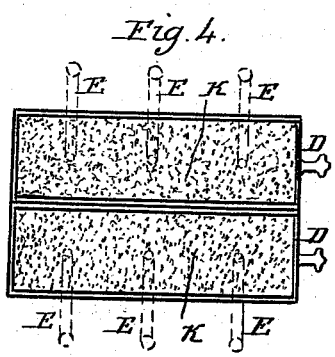

UNITED STATES PATENT OFFICE.

E. F. PRENTISS AND R. A. ROBERTSON, OF PHILADELPHIA, PENNSYLVANIA; SAID ROBERTSON ASSIGNOR OF HIS RIGHT TO W. D. PHILBRICK AND W. J. PARSONS.

IMPROVED APPARATUS FOR PURIFYING AND DEODORIZING WHISKY.

Specification forming part of Letters Patent No. 56,864, dated July 31, 1866.

*To all whom it may concern:*

Be it known that we, ELIJAH FREEMAN PRENTISS and ROBERT ADAM ROBERTSON, both of Philadelphia, in the State of Pennsylvania, have invented a new and useful Improvement in Apparatus for Purifying and Deodorizing Whisky and other Alcoholic Liquids; and we do hereby declare that the following is a full, clear, and exact description of the construction and operation of the same, reference being had to the annexed drawings, forming part hereof, and the letters of reference marked thereon.

The nature of our improvement consists in a device for finely dividing alcoholic vapor, and submitting it, while in that condition, to the action of a purifying agent in solution.

We shall describe our improvement as applied to the apparatus for distilling whisky and other spirits for which Letters Patent were granted to us March 1, 1864; but it will be evident to any one skilled in the art that our improvement is applicable to any form of still, but must be placed in such a position that the vapor will pass through it in its course from the vessel in which the alcoholic liquid is first vaporized to that in which it is finally condensed.

In the drawings, Figure 1 is a perspective view of the chamber described in the specification forming part of the said Letters Patent as chamber No. 3, showing also our improvement applied thereto. When our improvement is applied to stills of other construction it may be contained in a separate box. Fig. 2 is a vertical section of the same on the line A B of Fig. 1. Fig. 3 is a vertical cross-section of the same on the line $xy$ of Fig. 1. Fig. 4 is a horizontal section through the perforated drawers D.

To enable others skilled in the art to make and use our invention, we will proceed to describe its construction and mode of operation.

D are cases or drawers made of wire-gauze or other perforated material the equivalent thereof. These cases contain a granulated or otherwise finely-divided neutral substance, K, through the interstices of which the alcoholic vapor is compelled to pass on its way from the chamber described in said specification as chamber No. 4 to the chamber therein described as No. 2. The course of the vapor through the substance mentioned is shown by the arrows.

E are trap-tubes, by means of which we introduce onto the neutral substance K a solution of alkali or of alkaline salts, or of other substances having an equivalent purifying action. K represents the neutral material in the case D.

As to the other parts represented in the drawings, and not particularly related to our present improvement, G are pipes through which the vapor enters when coming from said chamber No. 4. H are pipes through which the purified vapor passes into said chamber No. 2. J are small tubes through which the vapor passes in the direction of the arrows.

The operation of our apparatus is as follows: The alcoholic vapor passes through the pipes G from the chamber called No. 4 in our aforesaid Letters Patent, and follows the course described by the arrows through the neutral body contained in cases D and out through the pipes H. The purifying solution (colored brown in the drawings) is introduced in regulated quantities through the trap-tubes E onto the top of the neutral body K, and diffuses itself over and through the mass of the neutral body, and thence drips downward, through the pipes J, into the bottom of the chambers, and thence, through the pipes G, into chamber No. 4, carrying with it the impurities removed from the alcoholic vapor. The vapor coming from said chamber No. 4, in passing through the interstices of the neutral substance K, is minutely divided, and its particles brought into more complete contact with the purifying agent, and thus more perfectly exposed to its action, by which we accomplish a better result with the use of much less of the purifying agents than has been hitherto effected.

For the neutral body we prefer to use pumice-stone or white porous sandstone (as their porosity facilitates the diffusion of the purifying agent) in grains or pieces about the size of a buckshot. It is not essential, however, that the neutral substance should be a porous one; but, whatever may be its nature in other respects, it should be in a sufficiently porous, perforated, cellular, or granulated state to finely divide the particles of vapor while it does not prevent their passage.

For the purifying agent we prefer to use carbonate of potash in solution, composed of about one pound of the salt to two gallons of water.

In distilling from ordinary corn-wash we obtain a good result by using, in the manner described, two gallons of this solution to every barrel of proof-liquor produced. The vapor from different kinds of wash will require some more and some less of the solution, according to the amount of impurities therein contained. The exact amount required for any particular wash can be readily ascertained by any one skilled in the art by testing the distillate.

Having thus described our invention, what we desire to secure by Letters Patent is—

The trap-tubes E, or their equivalents, in combination with the neutral material K, contained in one or more drawers or cases, in the manner and for the purpose substantially as shown and described, the whole being used in connection with a still, for the purposes herein set forth.

E. FREEMAN PRENTISS.
ROBERT ADAM ROBERTSON.

Witnesses:
THOMAS I. DIEHL,
J. E. SHAW.